US009589253B2

(12) United States Patent
Eby et al.

(10) Patent No.: US 9,589,253 B2
(45) Date of Patent: Mar. 7, 2017

(54) WORKFLOW AUTHORING ENVIRONMENT AND RUNTIME

(75) Inventors: Douglas A. Eby, Sammamish, WA (US); Steve Andrew De George, Duvall, WA (US)

(73) Assignee: Microsoft Technology Licensing, LLC, Redmond, VA (US)

( * ) Notice: Subject to any disclaimer, the term of this patent is extended or adjusted under 35 U.S.C. 154(b) by 528 days.

(21) Appl. No.: 12/815,403

(22) Filed: Jun. 15, 2010

(65) Prior Publication Data
US 2011/0307818 A1     Dec. 15, 2011

(51) Int. Cl.
| | |
|---|---|
| G06Q 10/10 | (2012.01) |
| G06Q 30/02 | (2012.01) |
| G06F 9/44 | (2006.01) |
| G06F 17/30 | (2006.01) |

(52) U.S. Cl.
CPC ......... *G06Q 10/103* (2013.01); *G06F 9/4446* (2013.01); *G06F 17/30056* (2013.01); *G06Q 30/0281* (2013.01)

(58) Field of Classification Search
CPC . G06Q 10/103; G06Q 30/0281; G06F 9/4446
USPC .................................................. 715/769, 705
See application file for complete search history.

(56) References Cited

U.S. PATENT DOCUMENTS

| | | | | |
|---|---|---|---|---|
| 5,432,940 A | * | 7/1995 | Potts et al. ..................... 719/320 |
| 5,481,667 A | * | 1/1996 | Bieniek ................. G06F 9/4446 |
| | | | | 715/709 |
| 5,513,991 A | * | 5/1996 | Reynolds et al. .............. 434/81 |
| 5,917,480 A | * | 6/1999 | Tafoya ....................... G06T 1/00 |
| | | | | 715/732 |
| 6,157,364 A | * | 12/2000 | Kohler .......................... 715/855 |

(Continued)

FOREIGN PATENT DOCUMENTS

DE       102010022141 A1 * 11/2011 ........... G06F 9/4446

OTHER PUBLICATIONS

Ramachandran Intelligent Context-Sensitive Help 2004.*

(Continued)

*Primary Examiner* — Jeffrey A Gaffin
*Assistant Examiner* — John M Heffington
(74) *Attorney, Agent, or Firm* — Kevin Sullivan; Kate Drakos; Micky Minhas (57) ABSTRACT

A workflow authoring system is described herein that provides a design-time authoring environment and a runtime component for displaying interactive, structured instructional content. The authoring environment provides custom controls, templates, and sample pages that allow authors to create a runnable workflow application. The application is a structured, interactive content type that provides users a better way to learn about data flows, workflows, and processes. The application also provides the ability to filter content based on specific actions the user takes, answers that the user provides, information that is retrieved from the user's environment, and so forth. This content model facilitates improved net satisfaction (NSAT) with software products, as users more readily find the information they are looking for and receive more dynamic instructional material. Authors that may not have programming experience can use the system to create rich, interactive content.

20 Claims, 4 Drawing Sheets

(56) References Cited

U.S. PATENT DOCUMENTS

| | | | |
|---|---|---|---|
| 6,289,382 B1* | 9/2001 | Bowman-Amuah | G06F 13/387 709/226 |
| 6,308,042 B1* | 10/2001 | Marsh et al. | 434/307 R |
| 6,332,163 B1* | 12/2001 | Bowman-Amuah | H04L 12/4604 709/217 |
| 6,339,832 B1* | 1/2002 | Bowman-Amuah | G06F 9/542 710/266 |
| 6,434,568 B1* | 8/2002 | Bowman-Amuah | G06F 17/30607 |
| 6,434,628 B1* | 8/2002 | Bowman-Amuah | H04L 29/06 714/1 |
| 6,438,594 B1* | 8/2002 | Bowman-Amuah | G06F 9/4428 709/203 |
| 6,442,748 B1* | 8/2002 | Bowman-Amuah | G06F 8/20 707/999.009 |
| 6,477,580 B1* | 11/2002 | Bowman-Amuah | G06F 9/54 709/231 |
| 6,477,665 B1* | 11/2002 | Bowman-Amuah | G06F 11/22 712/244 |
| 6,496,850 B1* | 12/2002 | Bowman-Amuah | G06F 9/4435 707/999.102 |
| 6,502,213 B1* | 12/2002 | Bowman-Amuah | G06F 9/4433 710/266 |
| 6,529,909 B1* | 3/2003 | Bowman-Amuah | G06F 17/30569 |
| 6,529,948 B1* | 3/2003 | Bowman-Amuah | G06F 9/4435 709/217 |
| 6,535,713 B1* | 3/2003 | Houlihan et al. | 434/350 |
| 6,539,396 B1* | 3/2003 | Bowman-Amuah | G06F 17/30607 707/769 |
| 6,549,949 B1* | 4/2003 | Bowman-Amuah | H04L 69/06 709/236 |
| 6,550,057 B1* | 4/2003 | Bowman-Amuah | G06F 17/30 700/80 |
| 6,571,282 B1* | 5/2003 | Bowman-Amuah | G06F 17/30893 707/999.01 |
| 6,578,068 B1* | 6/2003 | Bowman-Amuah | G06F 9/505 709/203 |
| 6,601,192 B1* | 7/2003 | Bowman-Amuah | G06F 11/3688 714/38.12 |
| 6,601,234 B1* | 7/2003 | Bowman-Amuah | G06F 8/24 705/7.37 |
| 6,606,660 B1* | 8/2003 | Bowman-Amuah | H04L 65/602 709/227 |
| 6,615,199 B1* | 9/2003 | Bowman-Amuah | G06F 9/443 706/50 |
| 6,615,253 B1* | 9/2003 | Bowman-Amuah | G06F 17/30902 707/999.1 |
| 6,640,238 B1* | 10/2003 | Bowman-Amuah | G06F 9/541 709/201 |
| 6,640,244 B1* | 10/2003 | Bowman-Amuah | G06F 9/466 707/999.01 |
| 6,640,249 B1* | 10/2003 | Bowman-Amuah | G06F 8/38 709/228 |
| 6,715,145 B1* | 3/2004 | Bowman-Amuah | G06F 8/20 718/100 |
| 6,742,015 B1* | 5/2004 | Bowman-Amuah | G06F 8/20 709/223 |
| 6,842,906 B1* | 1/2005 | Bowman-Amuah | G06F 9/465 718/104 |
| 6,954,220 B1* | 10/2005 | Bowman-Amuah | G06F 17/30893 707/999.009 |
| 7,048,544 B2* | 5/2006 | Olsen | 434/219 |
| 7,155,158 B1* | 12/2006 | Iuppa et al. | 434/350 |
| 7,289,964 B1* | 10/2007 | Bowman-Amuah | G06F 9/5038 705/1.1 |
| 7,299,418 B2* | 11/2007 | Dieberger | 715/732 |
| 7,512,892 B2 | 3/2009 | Sellers et al. | |
| 7,528,847 B2 | 5/2009 | Braun et al. | |
| 7,631,254 B2* | 12/2009 | Layard et al. | 715/202 |
| 7,647,553 B2 | 1/2010 | Mogilevsky et al. | |
| 7,743,331 B1* | 6/2010 | Fleischer et al. | 715/731 |
| 7,836,110 B1* | 11/2010 | Schoenbach | G06F 17/3002 707/829 |
| 8,069,413 B2* | 11/2011 | Methot | G06F 9/4446 715/705 |
| 8,108,777 B2* | 1/2012 | Penner et al. | 715/730 |
| 8,151,179 B1* | 4/2012 | Raman | G06F 17/30017 715/201 |
| 8,166,402 B2* | 4/2012 | Collins et al. | 715/732 |
| 8,182,270 B2* | 5/2012 | Elzinga et al. | 434/322 |
| 8,559,732 B2* | 10/2013 | Rayner | 382/224 |
| 8,572,088 B2* | 10/2013 | Lu | G06F 17/30056 707/739 |
| 8,762,864 B2* | 6/2014 | Flider et al. | 715/764 |
| 8,806,338 B2* | 8/2014 | Coldwell | 715/710 |
| 8,850,314 B2* | 9/2014 | Thompson | 715/705 |
| 8,862,982 B2* | 10/2014 | Pozharsky | 715/234 |
| 8,887,046 B2* | 11/2014 | Shmuylovich et al. | 715/705 |
| 8,972,859 B2* | 3/2015 | Saoumi | 715/707 |
| 8,977,958 B2* | 3/2015 | Deyo | G06F 9/4446 715/705 |
| 8,979,538 B2* | 3/2015 | Michelstein et al. | 434/118 |
| 2002/0042041 A1 | 4/2002 | Owens et al. | 434/322 |
| 2002/0119433 A1 | 8/2002 | Callender | 434/322 |
| 2002/0126140 A1* | 9/2002 | Gorbet | G06F 9/4446 715/708 |
| 2002/0178181 A1* | 11/2002 | Subramanyan et al. | 707/501.1 |
| 2003/0001875 A1* | 1/2003 | Black | G06F 9/4446 715/708 |
| 2003/0044761 A1* | 3/2003 | Houlihan et al. | 434/350 |
| 2003/0058277 A1* | 3/2003 | Bowman-Amuah | G06F 17/30607 715/765 |
| 2003/0073063 A1* | 4/2003 | Dattaray et al. | 434/350 |
| 2003/0077559 A1* | 4/2003 | Braunberger et al. | 434/322 |
| 2003/0122859 A1* | 7/2003 | Aggarwal | G06F 9/4446 715/708 |
| 2003/0222890 A1* | 12/2003 | Salesin et al. | 345/629 |
| 2004/0180312 A1* | 9/2004 | Covi et al. | 434/236 |
| 2004/0239699 A1* | 12/2004 | Uyttendaele | G06F 17/30855 715/716 |
| 2005/0026131 A1* | 2/2005 | Elzinga et al. | 434/365 |
| 2005/0055377 A1* | 3/2005 | Dorey | G11B 27/034 |
| 2005/0123892 A1* | 6/2005 | Cornelius et al. | 434/323 |
| 2005/0138570 A1* | 6/2005 | Good et al. | 715/789 |
| 2005/0193323 A1* | 9/2005 | Coulomb | G06F 17/241 715/230 |
| 2005/0283518 A1* | 12/2005 | Sargent | G06F 17/30861 709/201 |
| 2006/0031749 A1* | 2/2006 | Schramm | G06F 17/30056 715/201 |
| 2006/0046237 A1* | 3/2006 | Griffin et al. | 434/322 |
| 2006/0059253 A1* | 3/2006 | Goodman | G06Q 10/10 709/223 |
| 2006/0129931 A1* | 6/2006 | Simons | G06F 9/4446 715/705 |
| 2006/0179385 A1* | 8/2006 | Kreiner | G06F 17/5009 714/741 |
| 2007/0136667 A1* | 6/2007 | Gerhart | G06F 9/4446 715/705 |
| 2007/0218448 A1* | 9/2007 | Harmeyer et al. | 434/350 |
| 2007/0243517 A1* | 10/2007 | Olsen | 434/365 |
| 2008/0028313 A1* | 1/2008 | Ebert | 715/730 |
| 2008/0108025 A1* | 5/2008 | Menell | 434/118 |
| 2009/0132441 A1* | 5/2009 | Muller et al. | 706/11 |
| 2009/0210282 A1* | 8/2009 | Elenbaas et al. | 705/9 |
| 2009/0217159 A1 | 8/2009 | Dexter et al. | |
| 2009/0249446 A1 | 10/2009 | Jenkins et al. | |
| 2009/0271737 A1* | 10/2009 | Borkar | G06F 3/04845 715/821 |
| 2009/0313654 A1* | 12/2009 | Paila | G06F 17/30056 725/32 |
| 2010/0049719 A1 | 2/2010 | Payne et al. | |
| 2010/0049879 A1* | 2/2010 | Leavitt et al. | 710/14 |
| 2010/0190143 A1* | 7/2010 | Gal et al. | 434/322 |
| 2010/0218100 A1* | 8/2010 | Simon | G06F 17/30056 715/731 |
| 2011/0065082 A1* | 3/2011 | Gal et al. | 434/365 |

(56) References Cited

U.S. PATENT DOCUMENTS

2011/0066614 A1* 3/2011 Chowdhury ...... G06F 17/30056
707/736
2011/0231518 A1* 9/2011 Srinivasan ............ G06F 3/0484
709/219
2011/0307779 A1* 12/2011 Scholler et al. .............. 715/705
2012/0236143 A1* 9/2012 Weatherhead ................ 348/135

OTHER PUBLICATIONS

Boyer, John M., "Interactive Office Documents: A New Face for Web 2.0 Applications", Retrieved at << http://csis.pace.edu/~marchese/CS835/Student_Readings/p8-boyer.pdf >>, Document Engineering, Proceeding of the eighth ACM symposium on Document engineering, Sep. 16-19, 2008, pp. 8-17.

Tanya., "Software Update Deployment SuperFlow for SCCM", Retrieved at << http://www.technoworldinc.com/techno-news/software-update-deployment-superflow-for-sccm-t116188.0.html >>, Mar. 5, 2010, pp. 2.

* cited by examiner

WORKFLOW AUTHORING ENVIRONMENT AND RUNTIME

BACKGROUND

Software applications can perform a virtually limitless set of tasks today. Applications span all categories, from knowledge worker applications like MICROSOFT™ Word and Excel, to connectivity applications like email and instant messaging clients, to business applications like MICROSOFT™ Configuration Manager and BizTalk, to server applications like MICROSOFT™ Exchange, and so forth. Although ease of use is often a feature considered by software designers, due to the many functions that software applications provide, they cannot all work the same. Each application often involves user education to enable users to get the greatest benefit from the application and to learn each of the application's differentiating abilities.

Including instructional material directly within a software application has long been a common feature. Applications often provide a Help menu, F1 or other help invoking keystrokes, and context-sensitive help information. Help information has evolved from early information that resembled paper documentation (e.g., MICROSOFT™ HLP files with tables of contents and indexes like books) to more web-like content today with the rise of the Internet (e.g., MICROSOFT CHM files that include links, more visual content, and so forth). With the increase in continuously available Internet connections, many applications include online instructional material and client-side logic for combining both online and locally available help information.

Help information is often authored using specialized tools that receive static help content provided by technical writers. For example, MICROSOFT™ has for many years provided the Hypertext Markup Language (HTML) Help Workshop set of tools for producing HTML-based documentation. These tools often follow a document creation approach similar to word processing, where technical writers decide on topics for articles, create articles by writing content for them, and then organize the articles into hierarchies that represent some organizational system that seems sensible for the particular application (e.g., by user goal, by application features, and so forth). In some cases, the technical writers associate help context identifiers with identifiers set programmatically throughout the application so that when a user request context sensitive help an application can navigate the user quickly to an appropriate help article.

One problem with current software application instructional material is that it is very static in nature. Currently no content models provide an environment for creating interactive content and providing guidance to authors for creating and organizing structured information that is interactive in nature. Although an online component may allow frequent updating to add additional information, instructional material is still largely in the form of an article or reference guide to be read from beginning to end in hopes of solving the user's problem or educating the user about a particular topic. Although the help system of an application may know a context reference that identifies what feature the user is currently using, the application often does not know where the user is stuck, what information the user is very familiar with versus what information the user will still need to learn to complete a task, and so forth. Most of the burden is placed on the user to sift through material that may contain as much irrelevant information as relevant information. In addition, the user may have to refer back and forth to a current task and the instructional material with little indication other than scrolling to a particular position that the user has made any progress within the help information.

Prior solutions are limited in how they can address these problems. For example, the MICROSOFT™ Compiled HTML Help (CHM) file type provides a Table of Contents (TOC) in a left pane and displays associated content in a right pane after a user selects a TOC item. This format does not scale well to different content styles, formats, and design. For example, CHM is limited to a two-pane window, does not support interactive components such as buttons and other controls, does not support embedded video, and so on.

SUMMARY

A workflow authoring system is described herein that provides a design-time authoring environment and a runtime component for displaying interactive, structured instructional content. The authoring environment provides custom controls, templates, and sample pages that allow authors to create a runnable workflow application. The application is a structured, interactive content type that provides users a better way to learn about data flows, workflows, and processes. The application also provides the ability to filter content based on specific actions the user takes, answers that the user provides, information that is retrieved from the user's environment, and so forth. This content model facilitates improved net satisfaction (NSAT) with software products, as users more readily find the information they are looking for and receive more dynamic instructional material. Authors that may not have programming experience can use the system to create rich, interactive content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A workflow authoring system is described herein that provides a design-time authoring environment and a runtime component for displaying interactive, structured instructional content. The authoring environment provides custom controls, templates, and sample pages that allow authors to create a runnable workflow application. The application is a structured, interactive content type that provides users a better way to learn about data flows, workflows, and processes, troubleshoot issues, and so forth. The application also provides the ability to filter content based on specific actions the user takes, answers that the user provides, information that is retrieved from the user's environment, and so forth. This content model facilitates improved net satisfaction (NSAT) with software products, as users more readily find the information they are looking for and receive more dynamic instructional material.

The authoring environment of the workflow authoring system contains custom controls, templates, and sample pages, as well as other custom items that collectively provide a blueprint for creating interactive content and allow authors to design and build a runtime application. The application that results from the build process provides users with an interactive content experience that scales to many different styles, designs, and formats. The application can adapt to steps performed by the user to highlight next or additional steps to be performed, can take in information from the user's environment to eliminate inapplicable steps, and so forth. The authoring environment produces an application that provides a design and structure for displaying interactive content in a consistent manner. In some embodiments, the workflow authoring system provides a consistent executable (EXE) file that consumes workflow content created by the authoring environment and stored in a separate module such as a dynamically linked library (DLL). Thus, the system provides a design environment for authoring rich instructional material and a runtime component for consistently providing the instructional material to users. Authors that may not have programming experience can use the system to create rich, interactive content.

There are two main areas to the workflow authoring system, the design time authoring environment and the run time application. Currently, there are many ways to display interactive content by using MICROSOFT™ SILVERLIGHT™, ADOBE™ Flash, HTML, and so forth. However, a problem with these methods is that the author is expected to be very technical in the specific area to create the content. The authoring environment of the workflow authoring system provides tools that collectively deliver a blueprint for creating interactive content so authors can easily create and build an instructional application. These tools include custom objects, templates and sample pages that simplify the process of creating great instructional material for content authors. Custom objects have been developed that provide custom controls that make up the basic structure for the application, expose properties that can be configured on specific objects, expose different styles for objects that can be selected, and so on. For example, the system may provide a flow item that provides a common workflow set of steps, a custom page host that can receive various content types, a document rendering engine for rendering various content types, smart tabs for organizing content on a page, and so forth. Templates are provided to authors as a starting point when they want to author an application with the system. The templates include pre-configured objects that contain boilerplate text, a default style, and default formatting for a variety of documentation styles. There is a large set of sample pages that provide examples of how to author a variety of workflows, styles, themes, formatting, and so on.

The second major area is the resulting application. The design time environment builds authored content, which bundles the content into a consumable format. An application that results from the build process provides users with an interactive content experience that scales to many different styles, designs, and formats. It also provides a consistent look and feel even when displaying different types of content, different styles, and so on. The application is a structured, interactive content type that provides users a better way to learn about data flows, workflows, and processes, troubleshoot issues, and so forth. The application also provides the ability to filter content based on specific actions the user takes, answers that the user provides, information that is retrieved from the user's environment, and so on. The application allows customers to more effectively use products, troubleshoot issues, learn workflows, and so forth.

Figure 1:
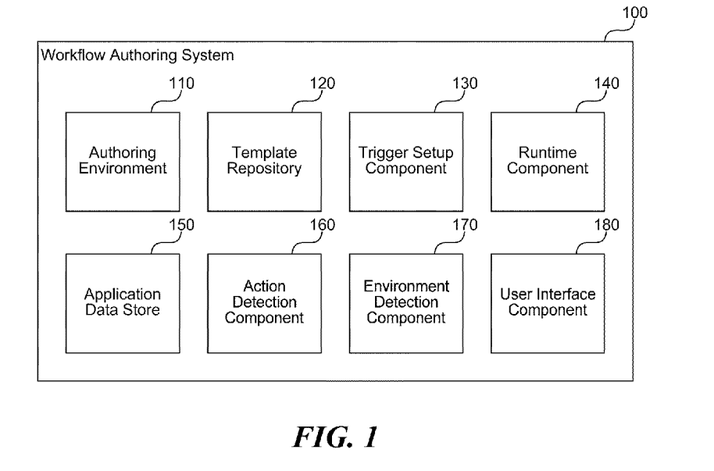
FIG. 1 is a block diagram that illustrates components of the workflow authoring system, in one embodiment.

FIG. 1 is a block diagram that illustrates components of the workflow authoring system, in one embodiment. The system 100 includes an authoring environment 110, a template repository 120, a trigger setup component 130, a runtime component 140, an application data store 150, an action detection component 160, an environment detection component 170, and a user interface component 180. Each of these components is described in further detail herein.

The authoring environment 110 provides a user interface through which an author creates one or more workflows that provide content-relevant instructional material to users of a software application. The authoring environment may include a standalone custom authoring environment, or may extend existing authoring environments for creating workflows. For example, MICROSOFT™ Expression Blend provides an extensible authoring environment that can be extended to allow creation of workflows using the system described herein. The authoring environment 110 allows the author to select controls, templates, sample files, and so forth to include in a workflow project. The workflow project represents and organizes each of the parts that will comprise an instructional application. The authoring environment 110 provides a facility for compiling or processing workflow parts to output a module or other persistent storage format for the instructional application. The storage format can be read by the runtime component 140 to display the instructional application to a user.

The template store 120 is a data store that stores one or more controls, sample files, and templates for assisting an author with creating workflows. The store 120 may include common workflow types or steps that can be dragged and placed within a visual display of the workflow project to create the workflow steps. The author may select from available controls in the store 120 or create new controls to accomplish whatever description or purpose the author wants to convey through the workflow. Examples of controls may include Boolean steps with a Yes/No button, video playback controls, common flow diagram blocks, user icons, and so forth. The template repository may include one or more files, file systems, databases, cloud-based storage services, or any other facility for storing sample data. For example, the system 100 may store templates hierarchically in an extensible markup language (XML) file. The template store 120 can be one or more files, file systems, databases, online web sites, cloud-based storage services, and so on. The template store 120 may include a starting project for beginners that includes sample components that are extensions of the internal templates available to the author.

The trigger setup component 130 receives triggers from the author that cause displayed content to change based on user actions. For example, the author may insert a control onto a workflow that asks the user a question and includes yes and no buttons. Based on the user's choice indicated by which button the user presses, the system 100 may display different subsequent content as well as visually indicate a path the user selected. For example, in a troubleshooting application, the choices may represent troubleshooting steps taken by the user and the choices determine which steps the user is prompted to try next. A trigger may cause a different article to be displayed in a right pane, text to be hidden that is not relevant based on the choice, or other actions that help present the user with the most relevant content.

The runtime component 140 provides an executable module that can load and display authored workflows. In some embodiments, the build process of the authoring environment 110 outputs a module and XML content that describes an authored workflow, including which content to display initially. The runtime component 140 reads the XML content, loads the module, and displays the initial content to the user. As the user selects within the content, the runtime component 140 displays additional content stored within the output module. The runtime component 140 provides generic functions that are applicable to many different types of workflows, and the workflow module uses the generic functions to provide specific workflow functionality.

The application data store 150 is a storage format for storing authored workflow applications. The storage format may include one or more files (e.g., XML or DLL files), file systems, databases, and so forth. The application data store 150 may include multiple stored applications for multiple workflows stored on a computer system. For example, each software application may have an associated workflow application that provides help information for the software application.

The action detection component 160 detects one or more user actions as a user interacts with a running workflow application. The user actions may include pressing buttons, clicking links, or any other selection or action received by a particular workflow control for indicating a different content path. Upon detecting the user action, the system 100 displays instructional content based on a path associated with the detected action. For example, if a user is troubleshooting a printer, a workflow step might ask the user if the printer is out of paper. If the user indicates that the printer is out of paper, then the system 100 may display content related to reloading the paper. If the user indicates that the printer is not out of paper, then the system 100 may display content for a next troubleshooting step to identify the problem.

The environment detection component 170 detects one or more conditions of a computing environment in which the system 100 is operating, and provides information to the workflow application. For example, the component 170 may detect particular peripherals attached to a computer system, environment variables, properties of the user (e.g., male, age, novice), and so forth. The system 100 may combine user actions with environmental conditions to display context-relevant instructional material to the user. The system 100 determines whether to use the environment detection component 170 based on actions taken by the workflow application. Some applications may make no use of environmental factors and others may rely on environmental factors extensively. This functionality is provided flexibly for authors to incorporate as needed.

The user interface component 180 provides an interface to the user during run time to display instructional information to the user and receive user actions that determine which instructional material to display. The user interface may include various forms of input (mouse, touch, keyboard, pen, and so forth) and multiple forms of output (e.g., display to screen, audible output, printable output).

The computing device on which the workflow authoring system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
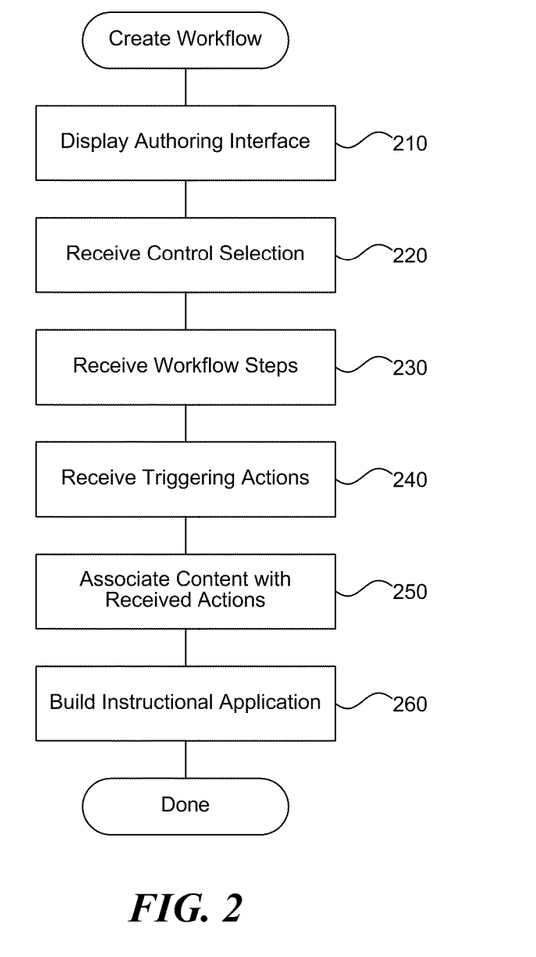
FIG. 2 is a flow diagram that illustrates processing of the workflow authoring system to allow an author to create instructional material displayed based on user actions, in one embodiment.

FIG. 2 is a flow diagram that illustrates processing of the workflow authoring system to allow an author to create instructional material displayed based on user actions, in one embodiment. Beginning in block 210, the system displays an authoring interface through which the author can select one or more elements to include in a workflow. The elements may be selected from a repository of custom controls, templates, and sample pages or created by the author independently. Workflows may include sequences of steps in various forms, such as flow charts, lists, and so forth. The authoring interface may provide a canvas on which the author can drag and drop controls and position the controls in a layout. The system displays the layout during run time with controls where the author placed them during design time.

Continuing in block 220, the system receives a control selection for inclusion in the workflow. For example, the author may select from a control toolbox or list and drag the controls onto the canvas described in the previous example. The author may also set properties of the control, such as its theming (e.g., color, font), size, number of buttons, text, and so forth. The system may allow third parties to add new controls and/or templates from which authors can select, and the author may save common layouts as templates for future reuse.

Continuing in block 230, the system receives a sequence of workflow steps related to a set of actions the user can perform. For example, if the workflow is a troubleshooting application, then the steps may include diagnostic steps that the user can perform. The sequence of steps may include one or more decision points that affect which steps or instructional material is displayed to the user. For example, based on a user's choice, some steps may become irrelevant or inapplicable, and other steps may become more relevant. Continuing in block 240, the system receives one or more triggering actions that a user can perform to determine the instructional material displayed to the user. For example, the workflow may include a yes or no question that allows the user to provide a response (e.g., by clicking a button) and based on the response the system may display different instructional material. The triggering actions may also include environment conditions, such as properties of a computer system on which the system is executing.

Continuing in block 250, the system receives an association between the received triggering actions and instructional content related to the actions. For example, the author may provide a help article associated with each path of a decision, and at run time the system may display the appropriate article in a right pane or other location when the user takes action in the left pane or other location. Unlike previous systems, the user navigates content in the workflow authoring system through real time actions rather than through arbitrary systems of organization of the instructional material. Continuing in block 260, the system builds an instructional application by combining the received control selections, workflow steps, triggering actions, and associated content into a module that can be used by a runtime component to display the instructional material and respond to user actions. For example, the system may compile the material into a DLL or XML file that can be read at runtime to display one or more layouts created by the author. After block 260, these steps conclude.

Figure 3:
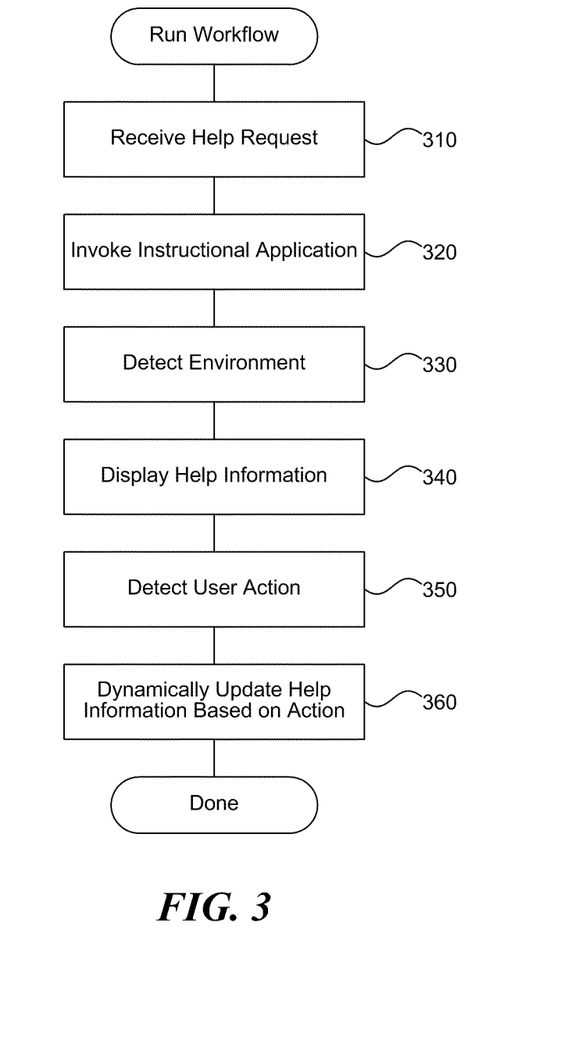
FIG. 3 is a flow diagram that illustrates processing of the workflow authoring system to display instructional material that changes based on user actions, in one embodiment.

FIG. 3 is a flow diagram that illustrates processing of the workflow authoring system to display instructional material that changes based on user actions, in one embodiment. Authors can create a variety of instructional application types, ranging from traditional table of contents (TOC) or CHM style to interactive, responsive applications. Beginning in block 310, the system receives a help request that identifies an instructional application including one or more workflows that display associated instructional material. For example, a software application may include an associated help application and the user may initiate a help request by invoking a help option within the software application. As another example, the user may directly invoke the instructional application, such as from an operating system desktop. Continuing in block 320, the system invokes the identified instructional application. The system may optionally provide the instructional application with parameters or command line options that indicate a context of the help request, such as a location of the user within the software application when the help request was initiated. The instructional application may include a generic runtime executable and a specific workflow stored in a module or other storage format that is read by the runtime executable.

Continuing in block 330, the system optionally detects one or more properties of an environment in which the instructional application executes. For example, the system may detect attached hardware, software settings, user settings, and so forth associated with the environment. Instructional application authors can choose whether to factor in environmental considerations depending on the purpose of their instructional applications. Continuing in block 340, the system displays help information in response to the received help request. For example, the system may display a workflow determined based on context information associated with the help request. The displayed help information may include one or more choices that the user can make to refine the type of help that the user needs to complete a task or goal.

Continuing in block 350, the system detects a user action within a workflow that identifies a particular path within the workflow. For example, a workflow may include a decision point with a yes or no button, and the user may select the yes button. The decision point may lead to different workflow paths based on the decision made. In some cases, rather than a decision the user may indicate that a previous step is complete, allowing the workflow to progress and display information about the next step. In this way, the user is not presented with potentially confusing information until the user is ready for the information. Continuing in block 360, the system dynamically updates the displayed help information based on the detected user action to display more relevant help information. For example, the system may display a help article associated with the user's current progress through a set of steps associated with the workflow. After block 360, these steps conclude.

Figure 4:
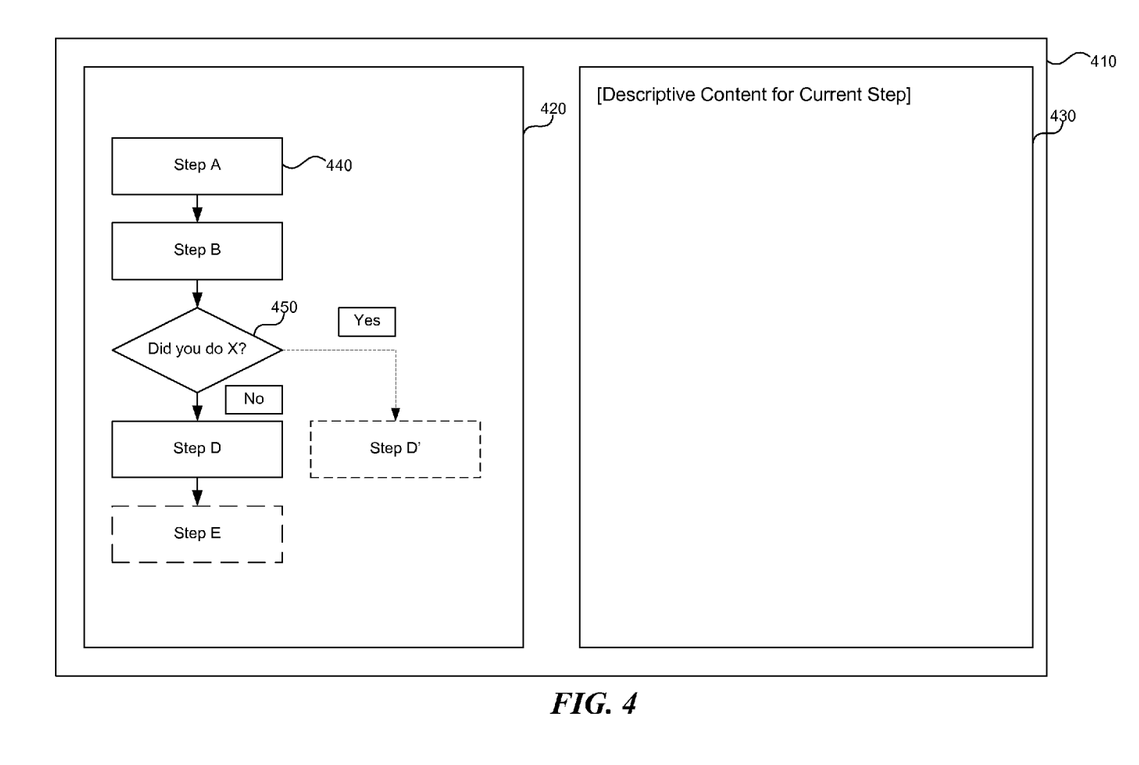
FIG. 4 is a display diagram that illustrates a runtime user interface of the workflow authoring system, in one embodiment.

FIG. 4 is a display diagram that illustrates a runtime user interface of the workflow authoring system, in one embodiment. The display diagram includes a window 410 with a left pane 420 and a right pane 430. Although a left pane 420 and right pane 430 are shown, the application author could choose other formats for the instructional application, and the one provided here is one example. The left pane 420 includes a workflow 440 comprised of a series of steps that provide instructions to the user. The right pane 430 displays a help article with more detailed user instructions related to the current step. The workflow 440 includes a decision point 450 where the user can select yes or no in response to a question. The workflow 440 is highlighted along the path the user has taken, and steps beyond the user's current location are faded to avoid distracting the user and to bring the most relevant content to the user's attention. Based on the user's choice at the decision point 450, the application displays an appropriate next step in the workflow 440 and updates the contents of the right pane 430 to match the selected next step.

In some embodiments, the workflow authoring system includes a tab control that authors can insert to subdivide content. For example, an author may include tabs that display content based on the skill level of the user, such as a novice tab, an expert tab, and so forth. The expert tab may include more in depth information or advanced settings that the user can modify. In some embodiments, a user's answers to questions or path through a workflow may cause the system to display additional tabs or remove tabs based on the associated information to be displayed.

In some embodiments, the workflow authoring system includes a component for taking actions on behalf of the user. For example, rather than only suggesting that a user perform a step, the system may include a button or link that the user can activate to have the system carry out the suggested action. If the action is modifying a configuration parameter, then activating the control may cause the system to modify the configuration parameter on the user's behalf. In some embodiments, the user's responses to questions allow the system to build a script with which to perform a task, and at the end of the workflow or upon the user's instruction, the system invokes the script to carry out the task.

In some embodiments, the workflow authoring system can receive scripts or executables in association with a workflow. For example, an author may provide a script to be run when a user selects a particular control or navigates to a particular path in a workflow. The scripts may query environment information, make decisions, take actions, and so forth. The scripts may be written in a common scripting language, such as JavaScript, or custom language defined by the system.

In some embodiments, the workflow authoring system includes a video control that allows authors to embed video in a workflow. The video control may receive information about the user's previous choices to determine a point in the video from which to begin playback. The video may include an audiovisual demonstration instructing the user how to perform a task. The video may be embedded within other instructional content related to the video.

In some embodiments, the workflow authoring system allows the user to make and store notes within a workflow. For example, the system may include a notes control that an author can insert into a workflow so that the user can make notes. For example, the user may record information about the configuration of computer systems or other information related to a workflow through which the user has navigated.

In some embodiments, the workflow authoring system uses Internet standards to consume and define content. For example, the system may receive HTML content pages from an author and format the pages using Cascading Style Sheets (CSS). These rich standards allow a wide variety of content types and formatting options, allowing a content author to theme content to match a particular application's color scheme, fonts, and other visual distinctions.

In some embodiments, the workflow authoring system leverages existing platforms to provide the run time instructional application. For example, the build process of the authoring environment may output a MICROSOFT™ SILVERLIGHT™ application that can run within a browser or in standalone versions of such platforms. The instructional application may also consume and display MICROSOFT™ SILVERLIGHT™ or other web component content.

From the foregoing, it will be appreciated that specific embodiments of the workflow authoring system have been described herein for purposes of illustration, but that various modifications may be made without deviating from the spirit and scope of the invention. Accordingly, the invention is not limited except as by the appended claims.

We claim:

1. A computer-implemented method for allowing an author to create instructional material displayed based on user actions, the method comprising:
  displaying an authoring interface of an authoring system configured to build an executable workflow software application, the authoring interface enabling the author to design the executable workflow software application by:
    receiving, from the author, a selection of one or more elements to include in a workflow to be presented by the executable workflow software application, the workflow displaying instructional material for using a software application;
    receiving, from the author, a control selection for inclusion in the workflow;
    receiving a sequence of workflow steps selected by the author that is related to a set of actions the user can perform in the workflow;
    receiving one or more triggering actions selected by the author that a user can perform to determine the instructional material displayed to the user via the executable workflow software application, the instructional material being dynamically updateable to display help information to the user related to the user's current context and one or more previous choices in the software application, and at least one of the one or more triggering actions comprising receiving one or more executing environment conditions that affect the displayed instructional material and the one or more executing environment conditions that affect the displayed instructional material including at least one of user settings, peripherals, and user properties;
    receiving, from the author, an association between the received triggering actions and instructional content related to the actions; and
    storing the workflow for subsequent display to a user by the executable workflow software application,
  the preceding steps being performed by at least one processor.

2. The method of claim 1 wherein displaying the authoring interface further comprises providing a repository of controls from which the author can select.

3. The method of claim 1 wherein displaying the authoring interface further comprises providing a canvas on which the author can drag and drop controls and position the controls in a layout.

4. The method of claim 1 wherein receiving the control selection comprises receiving an indication that the author selected the control from a control toolbox and dragged the control onto a canvas associated with the workflow.

5. The method of claim 1 wherein receiving the sequence of workflow steps comprises receiving one or more decision points that affect which instructional material is displayed to the user.

6. The method of claim 1 wherein receiving one or more triggering actions comprises receiving a yes or no question that allows the user to provide a response and based on the response displaying different instructional material.

7. The method of claim 1 wherein the one or more executing environment conditions that affect the displayed instructional material include at least one of hardware settings, and software settings.

8. The method of claim 1 wherein receiving an association comprises receiving a help article associated with each path of a decision, and at run time displaying the associated article in response to a selection of a decision path.

9. The method of claim 1 wherein the authoring system builds the executable workflow software application by combining the received control selections, workflow steps, triggering actions, and associated content into a module consumable by a runtime component to display the instructional material and respond to user actions.

10. A computer system for authoring interactive, dynamic instructional information, the system comprising:
  a processor and memory configured to execute software instructions;
  an authoring environment configured to build an executable workflow software application designed by an author, the author designing the executable workflow software application using a user interface provided by the authoring environment through which the author creates one or more workflows to be presented by the executable workflow software application, the one or more workflows providing content-relevant instructional material to a user of a software application, the instructional material being dynamically updateable by the executable workflow software application to display help information to the user related to the user's current context and one or more previous choices in the software application;
  a trigger setup component configured to receive triggers selected by the author that cause displayed content to change based on user actions;
  a runtime component configured to use an executable module built by the authoring environment to load and display authored workflows; and
  an application data store configured to store authored, executable workflow software applications;

the executable workflow software application being configured to:
- detect one or more user actions as the user interacts with the executable workflow software application;
- detect one or more conditions of a computing environment in which the executable workflow software application and the software application execute, the one or more conditions of the computing environment being unrelated to the user's interactions with the executable workflow software application; and
- provide an interface to the user during run time to display instructional information to the user and receive user actions that determine which instructional material to display.

11. The system of claim 10 wherein the authoring environment is further configured to extend existing authoring environments to allow the environment to create workflows.

12. The system of claim 10 wherein the authoring environment is further configured to allow the author to select controls to include in a workflow project.

13. The system of claim 10 wherein the authoring environment is further configured to provide a facility for compiling or processing workflow parts to output a persistent storage format for the instructional application, wherein the persistent storage format can be read by the runtime component to display the instructional application to a user.

14. The system of claim 10 further comprising a template repository configured to store one or more controls, sample files, and templates for assisting an author with creating workflows.

15. The system of claim 10 wherein the trigger setup component is further configured to receive a trigger that, upon activation in the executable workflow software application, causes a different informational article to be displayed to a user.

16. The system of claim 10 wherein the executable module is built by a build process of the authoring environment, and wherein the runtime component displays at least some content associated with the executable module to the user.

17. The system of claim 10 wherein the executable workflow software application is further configured to, upon detecting the user action, display instructional content based on a path associated with the detected action.

18. A method executed by at least one processor for controlling a computer system to display instructional material that changes based on user actions, comprising:
- receiving a help request that identifies an instructional application associated with a separate software application that a user is using, the instructional application including one or more workflows that display associated instructional material;
- invoking the identified instructional application;
- detecting one or more properties of an executing environment in which the instructional application executes, the one or more properties of the executing environment including at least one property of the executing environment that is not a component of the separate software application, and is not related to the user's interactions with the instructional application;
- displaying help information in response to the received help request, the displayed help information including one or more choices that the user can make to refine the type of help information that the user receives;
- detecting a user action within a workflow that identifies a particular path within the workflow; and
- dynamically updating the displayed help information based on the detected user action to display more relevant help information, the instructional material being dynamically updateable to display help information to the user related to the user's current context, one or more previous choices in the software application, and the detected one or more properties of the executing environment, said dynamically updating comprising at least one of highlighting a path of the workflow that a user has taken and fading one or more steps of the workflow that are not relevant to the user based on the detected user action.

19. The method of claim 18 wherein invoking the identified instructional application comprises invoking a generic runtime executable and a specific workflow stored in a module readable by the runtime executable.

20. The method of claim 18 wherein detecting the user action comprises identifying a decision point within a workflow and a user selection of a particular path associated with the decision point.

* * * * *